(12) United States Patent
Sevaux

(10) Patent No.: US 11,586,867 B2
(45) Date of Patent: Feb. 21, 2023

(54) COMPOSITE MERCHANDISE LABEL CONSTRUCTIONS

(71) Applicant: AVERY DENNISON RETAIL INFORMATION SERVICES, LLC, Mentor, OH (US)

(72) Inventor: Alain Sevaux, Ennery (FR)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 16/656,397

(22) Filed: Oct. 17, 2019

(65) Prior Publication Data

US 2020/0126454 A1 Apr. 23, 2020

Related U.S. Application Data

(60) Provisional application No. 62/746,744, filed on Oct. 17, 2018.

(51) Int. Cl.
*G09F 3/02* (2006.01)
*G06K 19/02* (2006.01)
(Continued)

(52) U.S. Cl.
CPC ............ *G06K 19/025* (2013.01); *B32B 37/12* (2013.01); *B32B 38/145* (2013.01);
(Continued)

(58) Field of Classification Search
CPC ............. G06K 19/025; G06K 19/0723; G06K 19/07722; G06K 19/067; G06K 19/07718;
(Continued)

(56) References Cited

U.S. PATENT DOCUMENTS 7,975,414 B2 * 7/2011 Ritamaki ......... G06K 19/07749
40/638
9,251,725 B2 * 2/2016 Raynaud ................... G09F 3/14
(Continued)

FOREIGN PATENT DOCUMENTS

DE 2843619 4/1980
DE 202011003520 5/2011
(Continued)

OTHER PUBLICATIONS

International Search Report and Written Opinion dated Dec. 13, 2019 issued in corresponding IA No. PCT/US2019/056794 filed Oct. 17, 2019.

*Primary Examiner* — Cassandra Davis

(57) ABSTRACT

Label constructions comprise a first section and a second section that are laminate constructions of a card stock top surface that may include printed indicia, an adhesive layer disposed underneath the card stock, and a removable liner adhered to the adhesive layer and common to the first and second sections. The first section includes an RFID device. The first section may be configured once removed from the liner to fold on itself to form an RFID tag, or to form an RFID adhesive label. The second section once separately removed from the liner forms an adhesive label. The construction first and second sections are positioned adjacent one another and are formed during the same manufacturing process for purposes of manufacturing efficiency. The first and second sections may be treated to facilitate separate removal from the liner to provide labeling flexibility.

7 Claims, 8 Drawing Sheets

(51) Int. Cl.
   *B32B 37/12*    (2006.01)
   *B32B 38/00*    (2006.01)
   *G06K 19/07*    (2006.01)
   *G09F 3/00*     (2006.01)
   *G06K 19/077*   (2006.01)
   *B41M 7/00*     (2006.01)

(52) U.S. Cl.
   CPC ....... *B41M 7/0027* (2013.01); *G06K 19/0723* (2013.01); *G06K 19/07722* (2013.01); *G09F 3/0288* (2013.01); *G09F 3/0297* (2013.01); *B32B 2519/02* (2013.01); *G09F 2003/023* (2013.01); *G09F 2003/0208* (2013.01); *G09F 2003/0255* (2013.01)

(58) Field of Classification Search
   CPC ... B32B 37/12; B32B 38/145; B32B 2519/02; B41M 7/0027; G09F 3/0288; G09F 3/0297; G09F 2003/0208; G09F 2003/023; G09F 2003/0255
   See application file for complete search history.

(56) References Cited

U.S. PATENT DOCUMENTS

| | | |
|---|---|---|
| 2004/0091659 A1 | 5/2004 | Banks et al. |
| 2007/0145150 A1* | 6/2007 | Barczyk ........... G06K 19/07749 235/492 |
| 2014/0007478 A1* | 1/2014 | Smith ................ G09F 3/10 40/674 |
| 2015/0154489 A1 | 6/2015 | Dancausse et al. |
| 2017/0161601 A1* | 6/2017 | Sevaux ............ G06K 19/07722 |
| 2018/0056676 A1* | 3/2018 | Kajihara .................... B41J 3/36 |
| 2020/0201262 A1* | 6/2020 | Verdickt ............... G09F 3/0292 |
| 2020/0251020 A1* | 8/2020 | Ambartsoumian ....... B65C 1/04 |

FOREIGN PATENT DOCUMENTS

| | | | | |
|---|---|---|---|---|
| DE | 202011003520 | * | 6/2011 | ......... G06K 19/0776 |
| JP | 2005196377 A | * | 7/2005 | ....... G06K 19/07771 |
| WO | 2017/100435 | | 6/2017 | |

* cited by examiner

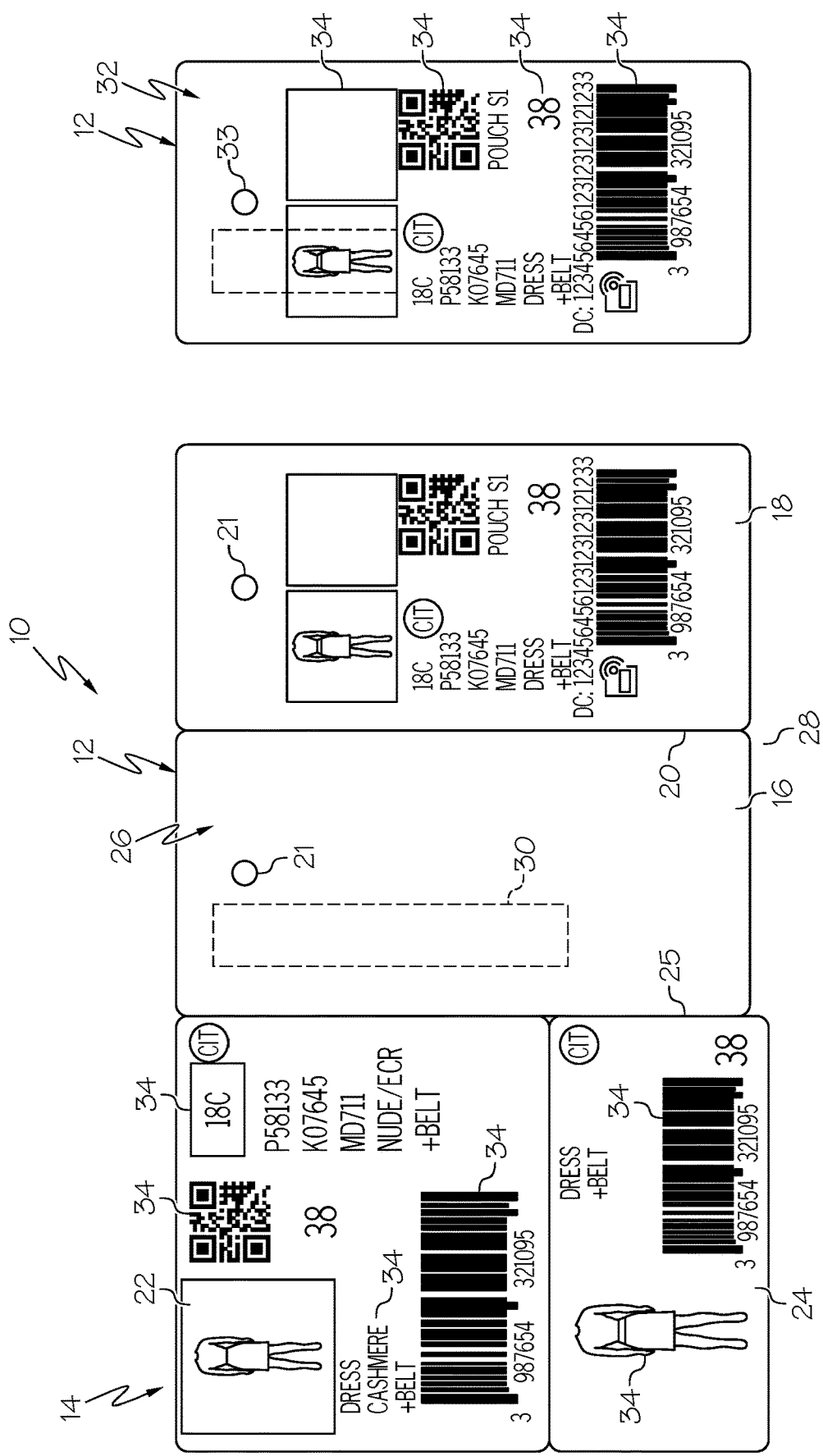

COMPOSITE MERCHANDISE LABEL CONSTRUCTIONS

CROSS REFERENCE TO RELATED APPLICATION(S)

The present application claims priority to and the benefit of United States provisional utility application No. 62/746,744 filed Oct. 17, 2018, which is incorporated herein by reference in its entirety.

FIELD

Label constructions as disclosed herein are constructed in a manner providing a merchant/end user an enhanced degree of flexibility regarding how labels may be used or affixed to an article or other object and, more specifically, to provide web-based label constructions capable of producing hang tag as well as adhesive labels.

BACKGROUND

Radio frequency identification (RFID) labels and tags are a common tool for labeling, identifying, and tracking various goods and people. The goods so labeled involve a wide range of industries and include packages being shipped, cars, keys, livestock, identification badges, and merchandise in stores. RFID tags, either active or passive, are typically used with an RFID reader to read information from the RFID tag embedded in the label. For passive tags, a typical RFID reader/writer energizes transponder circuitry in the tag by transmitting a power signal. The power signal may convey data, which can be stored in a transponder memory, or the transponder circuitry may transmit a response signal containing data previously stored in its memory. If the transponder circuitry transmits a response signal, the RFID reader/writer receives the response signal and interprets the stored data. The data is then transmitted to a host computer for processing.

Even with a growing trend toward RFID labels, there are advantages to placing optical information on a label so that the good has both optical and RFID information, such as having the ability to read the label using more than one technology. This may be beneficial because RFID label technology is not as widespread as barcode technology, and many businesses or users may not have suitable RFID readers to read the RFID tag. Thus, it is desirable to have both RFID and optically readable information on a single label. It is common for these labels to come in the form of adhesive stickers placed, for example, on packages for shipping.

While it may be useful in some applications to provide an RFID/optical label in the form of an adhesive sticker, in other applications an adhesive sticker may not be desired, e.g., where the adhesive may destructive to a good's surface during peel off or the like. Accordingly, it may be desired to provide the RFID/optical label in the form of a hang tag or the like that is attached to an article in a non-adhesive manner. Further, there are labeling applications where it may be desired to provide merchandise information in the form of both an adhesive sticker and a hang tag or other non-adhesive label form, where one of the labels contains an RFID device and the other does not. Still further, it may be desired to manufacture a label construction embodying such labeling options in a manner that is fast/efficient and that enhances end-use labeling flexibility.

SUMMARY

Example composite merchandise label constructions as disclosed herein comprise a first section and a second section that are each laminate constructions comprising a card or tag stock top surface, and adhesive layer disposed underneath the card stock, and a removable liner adhered to the adhesive layer, wherein the liner is common to the first and second sections. In an example, the first section may comprise first and second portions that are positioned adjacent one another and that may include a fold line interposed between the two portions. The first section may form a hang tag upon removal from the liner by combining the first and second portions together. In an example, the first section includes an RFID device disposed therein interposed between the two portions and may further include a hole for forming an RFID hang tag for attachment with a merchandise article. In an example, the first section may comprise a single portion that forms an adhesive label after removing from the liner, wherein such single portion includes an RFID device disposed therein so the resulting adhesive label is an RFID adhesive label that may be adhesively affixed to a merchandise article. In an example, the second section may include one or more portions that form an adhesive label by removing the one or more portions from the liner, wherein such removed portions may be adhesively affixed to a merchandise article.

In an example, the first and second sections are positioned adjacent one another in the label construction, and during the process of making the label construction the first and second sections may be isolated from one another by cut line or by a perforated line formed during the process of making the construction to facilitate independent removal of the first and second sections from the liner as desired by the end user for labeling flexibility, use and application. In an example, the first and/or second sections may include a variety of different printed indicia disposed along the top surface as called for by a particular end-use labeling application. In an example, the first and second sections may be formed using the same or different types of card or tag stock during the manufacturing process. In an example, the composite label construction comprising such first and second sections is formed during the same manufacturing process for purposes of manufacturing efficiency.

BRIEF DESCRIPTION OF THE FIGURES

Advantages of embodiments of the label constructions disclosed herein will be apparent from the following detailed description of the exemplary embodiments, which detailed description should be considered in conjunction with the accompanying figures.

FIG. 1A, FIG. 1B and FIG. 1C illustrate a first example embodiment composite label construction as disclosed herein;

DETAILED DESCRIPTION

Figure 1C:
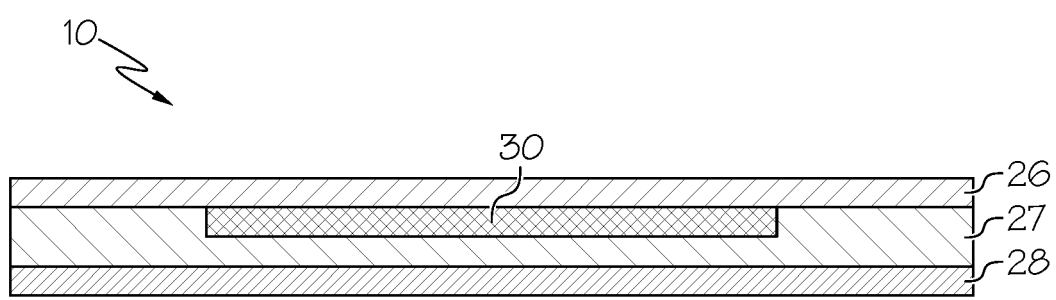

Aspects of composite label constructions are disclosed in the following description and related drawings directed to specific embodiments of such label constructions. Alternate embodiments may be devised without departing from the spirit or the scope of composite label constructions as disclosed herein. Additionally, well-known elements of exemplary embodiments of the composite label constructions will not be described in detail or will be omitted so as not to obscure the relevant details of such composite label constructions. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the composite label constructions include the discussed feature, advantage or mode of operation. Also, while label constructions as disclosed and illustrated may be used for labeling merchandise such articles of clothing, handbags, shoes, jewelry, and other human wear articles or accessories, it is to be understood that such label constructions may be used for labeling other objects and that such is within the scope of this description.

Composite label constructions as disclosed herein generally comprise a first section or portion that includes an RFID device, and a second section or portion that does not include an RFID device, wherein the first section may form a hang tag or other non-adhesively affixed label, and the second section may be in the form of an adhesive label. Alternatively, the first portion comprising the RFID device may be in the form of an adhesive label rather than a hang tag. Still further, the RFID label may comprise a portion that includes an adhesive and a portion that does not include an adhesive, e.g., where a part of the label has been folded over itself. A feature of such composite label constructions as disclosed herein is that the first and second sections are formed together during a web process, i.e., during the same manufacturing process, to thereby provide manufacturing efficiency while also providing a user with resulting label construction that enhances user labeling flexibility.

FIG. 1A illustrates a first embodiment composite label construction 10 comprising a first section 12 and a second section 14 positioned adjacent a longitudinal side of the first section 12. The first section 12 comprises two portions 16 and 18 that are that are integral with longitudinal line 20 disposed therebetween. Holes 21 are positioned along a top segment of the first and second portions. The second section 14 comprises first and second portions 22 and 24 that are positioned respectively near the top and bottom of the second section 14.

In an example embodiment, first and second sections 12 and 14 may be isolated from, detached from or perforatedly attached to one another to facilitate removal of the two sections 12 and 14 from one another for separate labeling use. A cut and/or perforated line 25 can be formed between the first and second sections during the process of making the label construction, e.g., by die cut process or the like. Additionally, the particular shape of the label construction sections, e.g., rounded corners and the like, may be formed by die cut process during manufacturing.

In an example, the label construction 10 has a top surface 26 formed from a desired tag or card stock or the like that may be made from paper, plastic, polymer or the like as called for by the end-use label application, e.g., it may be any material on which optically readable information/indicia can be printed. In an example, the material used to form the label construction top surface is the same for first and second sections 12 and 14. However, if desired, the top surfaces of the first and second sections may be formed from different types of material.

In an example, as illustrated in FIG. 1C, the label construction 10 (as taken through a longitudinal cross section across the first section first portion 16 including the RFID device) has a laminate structure comprising the top surface material 26, an adhesive layer 27 disposed under the top surface material, and a liner material 28 disposed underneath of the adhesive layer such that the adhesive layer is interposed between the top surface material and the liner. The RFID device 30 is shown interposed between the top surface material and the adhesive layer. In an example, the liner may be formed from a material having a relatively low coefficient of friction so as to be preferably removed from the label construction relative to the top surface to expose the adhesive layer. It is to be understood that the relative thicknesses of the different layers can and will vary depending on the particular label construction and/or end-use label application.

An RFID device 30 is disposed within the first section 12, and in an example embodiment, within the first section first portion 16. The RFID device is positioned between the top surface material and the adhesive layer. While an example comprising the RFID device disposed within the first section first portion is illustrated, it is to be understood that the RFID device may be provided in the form of an inlay or the like disposed in either of the first section first or second portion depending on the end-use application.

Additionally, the placement position of the RFID device in the particular first section, as well as the particular configuration of the RFID device, is understood to vary depending on the particular end-use application. The RFID device generally comprises a chip and an antenna and may be selected from those RFID devices known in the art used in RFID label applications. The RFID device my further comprise a transponder, a memory, and/or an optional energy storage device, or as desired for a particular application. The RFID device may be interrogated and read via any suitable RFID reader. Additionally, the RFID device may be re-programmable or fixed, or as desired. In an example embodiment, the RFID device is a UHF type that comprises a dipole antenna.

FIG. 1B illustrates the label construction first section 12 of FIG. 1A after the first section has been removed from the liner 28, and after the first section first and second portions have been folded into contact with one another along the fold line 20 to form a folded RFID tag 32. Configured in this manner, the RFID device 30 is protectively encapsulated between the first section first and second portions. In an example, the so-formed RFID tag has substantially no tackiness and may serve as a label, ticket or hang tag. As illustrated, the holes 21 from the first and second portions are aligned during folding to form a single hole 33 that enables the folded tag to be used as an RFID hang tag. The remaining label construction second section 14 first and second portions can be removed from the liner 28 for the purpose of providing adhesive labels for affixing to an article or other desired substrate. In an example embodiment, the label construction 10 is configured for use with clothing articles and the like.

In an example, the label construction first and second sections 12 and 14 may be printed or otherwise marked to include a variety of different optically readable indicia 34 that may be useful for the merchant and/or the user for a variety of purposes including article information, security information, RFID information, or the like. Examples of such indicia when the label construction is used with merchandise that includes clothing or wear articles include but are not limited to EAN, description of the product class, accessory coming with the RTW, description of the fabric or material, sketch of the article, fabric or material picture, item season, style code, fabric code, color code, model code, special finish, size, form designation, color description, size, cities, order number, pouch size, global DC internal reference number, N EPC, QR Code EPC, logo RFID, cleaning or care information, origin of article manufacture, and the like. It is to be understood that the information provided on the label construction will likely vary depending on the particular end-use application. The location of the information as displayed on the label construction can and will vary. Additionally, some or all of printing or marking may take place during the process of making the label construction, and/or may take place after the label construction is made and sold or otherwise transferred to a downstream user.

Figure 2A:
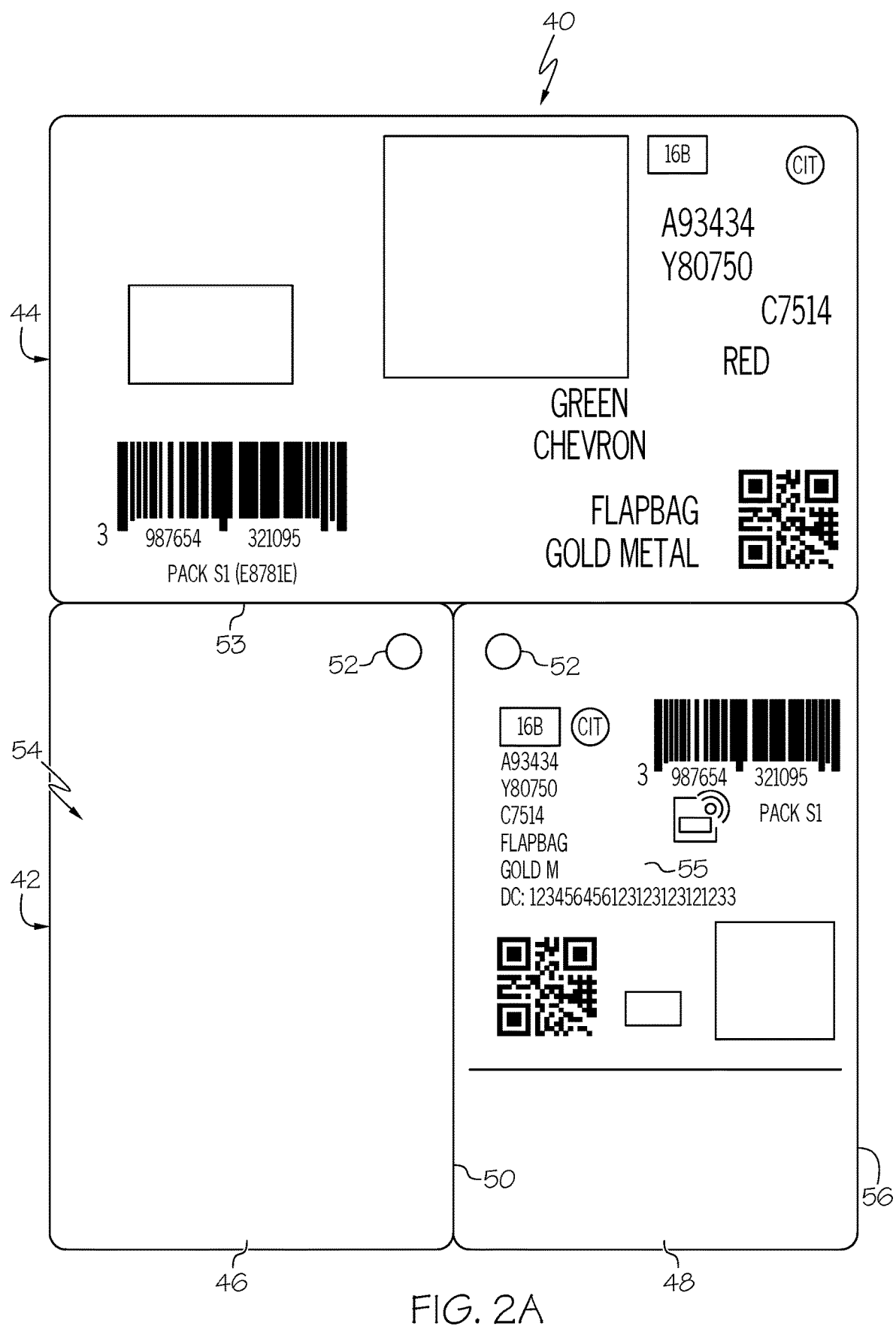
FIG. 2A and FIG. 2B illustrate a second example embodiment composite label construction as disclosed herein.

FIG. 2A illustrates a second embodiment composite label construction 40 that is configured somewhat similar to that of the embodiment described above and illustrated in FIGS. 1A, 1B, and 1C comprising a first section 42 and a second section 44, except that the second section 44 is positioned above the first section first and second portions 46 and 48. As noted above, a longitudinal fold line 50 separates the first section first and second portions 46 and 48, and holes 52 are positioned along a top segment of the first and second portions.

The second section 44 comprises a single portion and is isolated from, detached from or perforatably attached to the first section 42 to facilitate removal of the two sections 42 and 44 from one another by line 53 for separate labeling use. The label construction 40 comprises the top surface 54 and is a laminate construction of an adhesive layer and a release liner 56 as described above, with the first section 42 comprising an RFID device 55 disposed in the second portion 48.

Figure 2B:
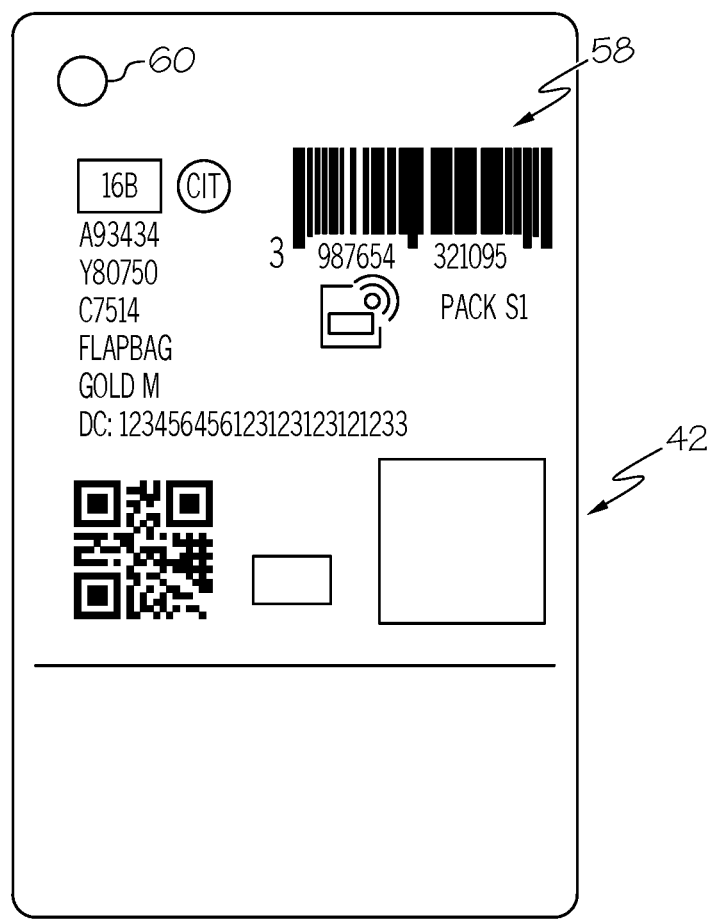

FIG. 2B illustrates the label construction first section 42 of FIG. 2A after the first section has been removed from the liner 56, and after the first section first and second portions have been folded into contact with one another along the fold line to form a folded RFID tag 58. The holes 52 from the first and second portions align during folding to form a single hole 60 that enables the folded tag to be used as an RFID hang tag, wherein the RFID device is protectively encapsulated between the first section first and second portions. The remaining label construction second section 44 can be separately removed from the liner 56 for the purpose of forming an adhesive label for affixing to an article or other desired substrate. In an example embodiment, the label construction 40 is configured for use with handbags and the like. As described above for the first example embodiment, the label construction first and second sections 42 and 44 may be printed or otherwise marked to include a variety of different indicia depending on the particular end-use application.

Figure 3A:
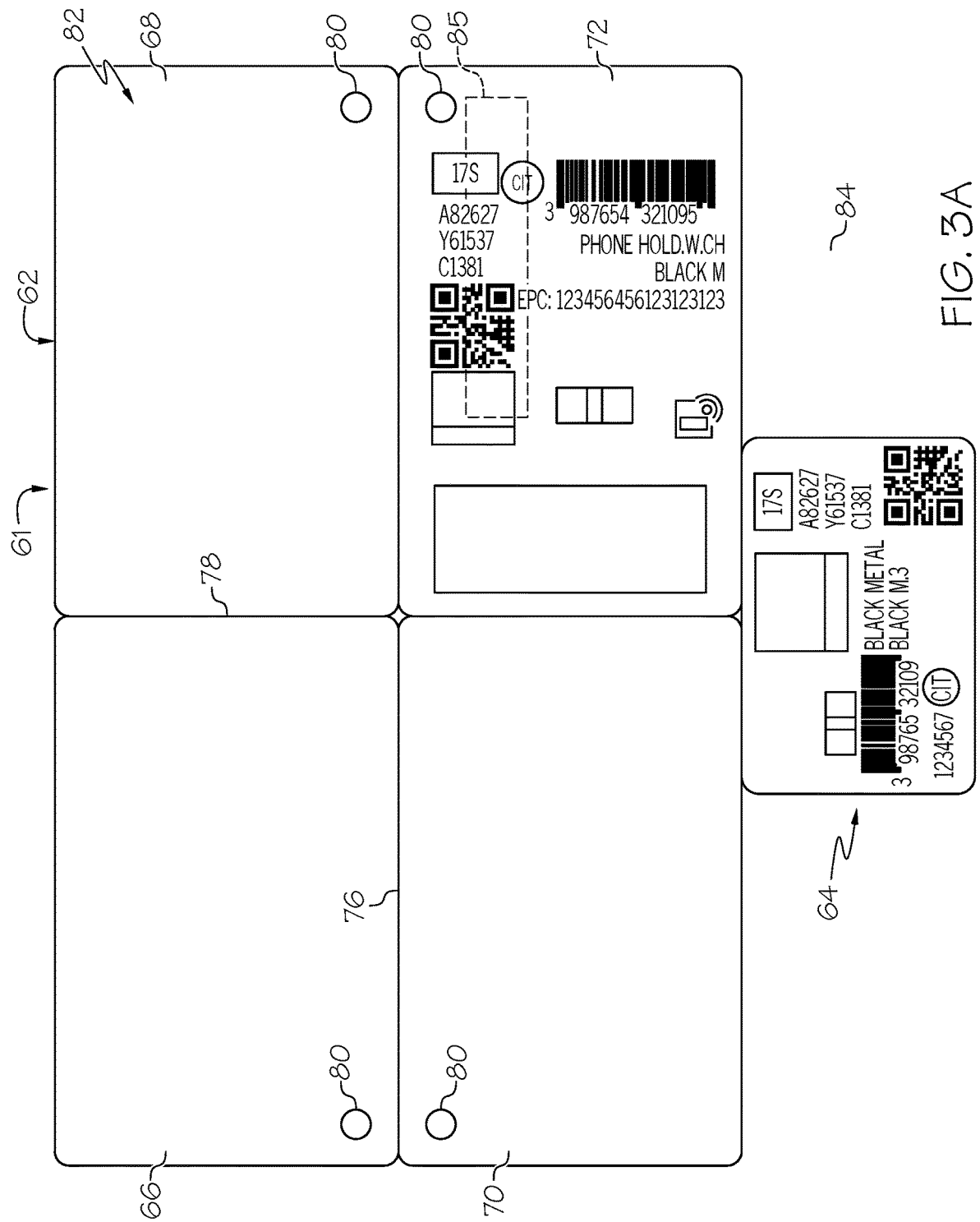
FIG. 3A and FIG. 3B illustrate a third example embodiment composite label construction as disclosed herein.

FIG. 3A illustrates a third embodiment composite label construction 61 that is configured somewhat similar to that of the earlier-described example embodiments, comprising a first section 62 and a second section 64, except that the first section comprises four portions 66, 68, 70 and 72, and the second section 74 is a single portion disposed below the first section 62. The first section 62 includes perpendicular fold lines 76 and 78 separating the four portions, and each of the four portions has a hole 80 positioned to align with the hole of an adjacent portion. The second section 64 is detached from or perforatably attached to the first section 62 to facilitate removal of the two sections for use. The label construction 60 comprises the top surface 82 and is a laminate construction of an adhesive layer and a release liner 84 as described above, with the first section 62 comprising an RFID device 85 positioned in one of its portions, e.g., portion 72.

Figure 3B:
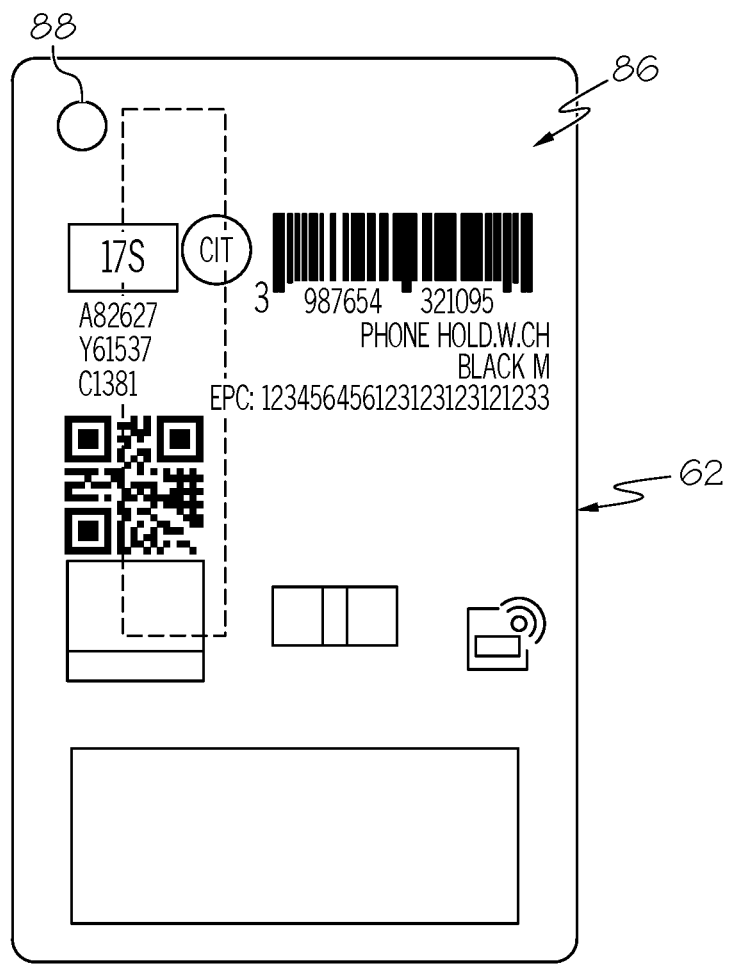

FIG. 3B illustrates the label construction first section 62 of FIG. 3A after the first section 62 has been removed from the liner 84, and after the first section four portions have been folded into contact with one another along the fold lines to form a folded RFID tag 86. The holes 80 from the four portions align during folding to form a single hole 88 that enables the folded tag to be used as an RFID hang tag, wherein the RFID device is protectively encapsulated within two of the first section portions. The remaining label construction second section 64 can be removed from the liner 84 for the purpose of forming an adhesive label for affixing to an article or other desired substrate. In an example embodiment, the label construction 60 is configured for use with small leather goods and the like. As described above for the first example embodiment, the label construction first and second sections 62 and 64 may be printed or otherwise marked to include a variety of different indicia depending on the particular end-use application.

Figure 4A:
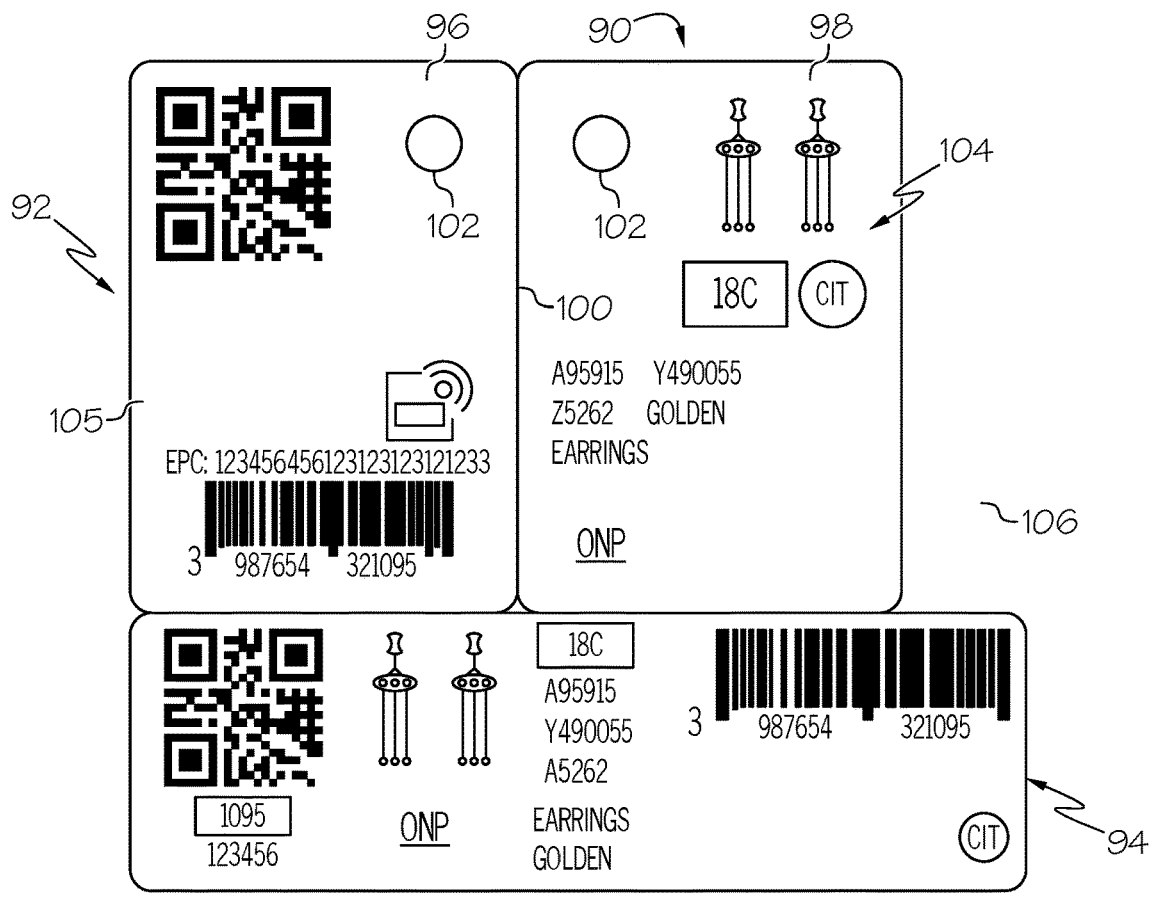
FIG. 4A and FIG. 4B illustrate a fourth example embodiment composite label construction as disclosed herein.

FIG. 4A illustrates a fourth embodiment composite label construction 90 that is configured somewhat similar to that of the embodiment described above and illustrated in FIGS. 2A and 2B, comprising a first section 92 and a second section 94, except that the second section 94 is positioned below the first section first and second portions 96 and 98. As noted above, a longitudinal fold line 100 is disposed between the first section first and second portions, and holes 102 are positioned along a top segment of the first and second portions. The second section 94 comprises a single portion and is detached from or perforatably attached to the first section 92 to facilitate removal of the two sections for use. The label construction 90 comprises the top surface 104 and is a laminate construction of an adhesive layer and a release liner 106 as described above, with the first section 92 comprising an RFID device 105 disposed in one of the portions, e.g., in this embodiment the first portion 96.

Figure 4B:
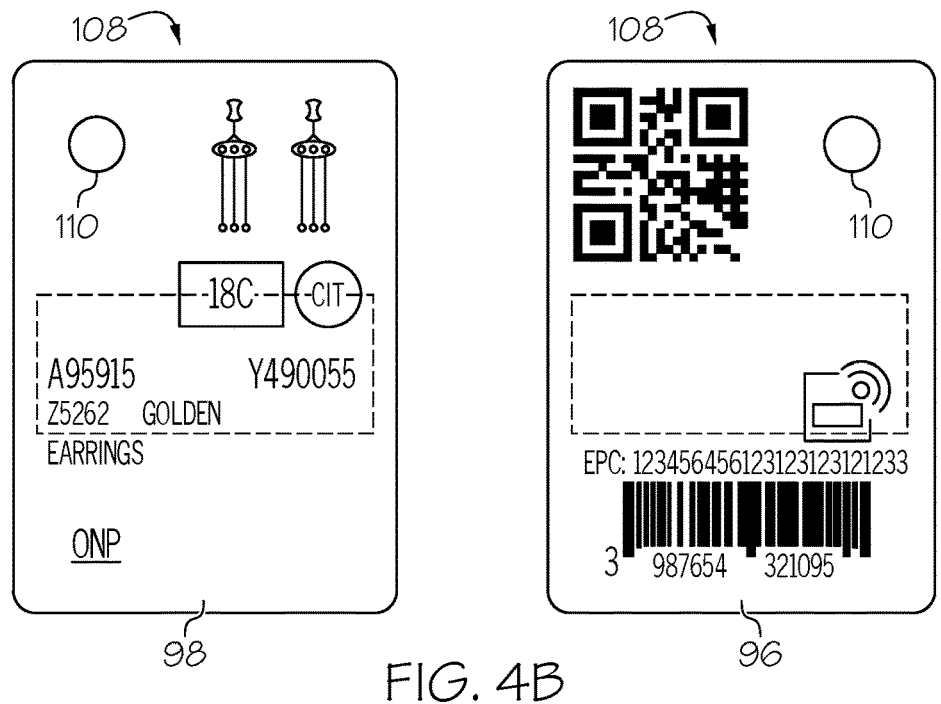

FIG. 4B illustrates front and back sides of the combined label formed from the first section first and second portions 96 and 98 after the first section 92 has been removed from the liner 106, and after the first section first and second portions have been folded into contact with one another along the fold line to form a folded RFID tag 108. The holes 102 from the first and second portions align during folding to form a single hole 110 that enables the folded tag to be used as an RFID hang tag, wherein the RFID device is protectively encapsulated between the first section first and second portions. The remaining label construction second section 94 can be removed from the liner 106 for the purpose of forming an adhesive label for affixing to an article or other desired substrate. In an example embodiment, the label construction 90 is configured for use with jewelry and accessories and the like. As described above for the first example embodiment, the label construction first and second sections 92 and 94 may be printed or otherwise marked to include a variety of different indicia depending on the particular end-use application.

While particular examples of label constructions comprising both RFID hang tag sections and adhesive label sections have been disclosed above and illustrated, it is to be understood that the relative placement position and/or configuration of the different label sections and/or section portions may vary depending on the particular end-use labeling application, and that such variation is within the scope of this description.

Figure 5:
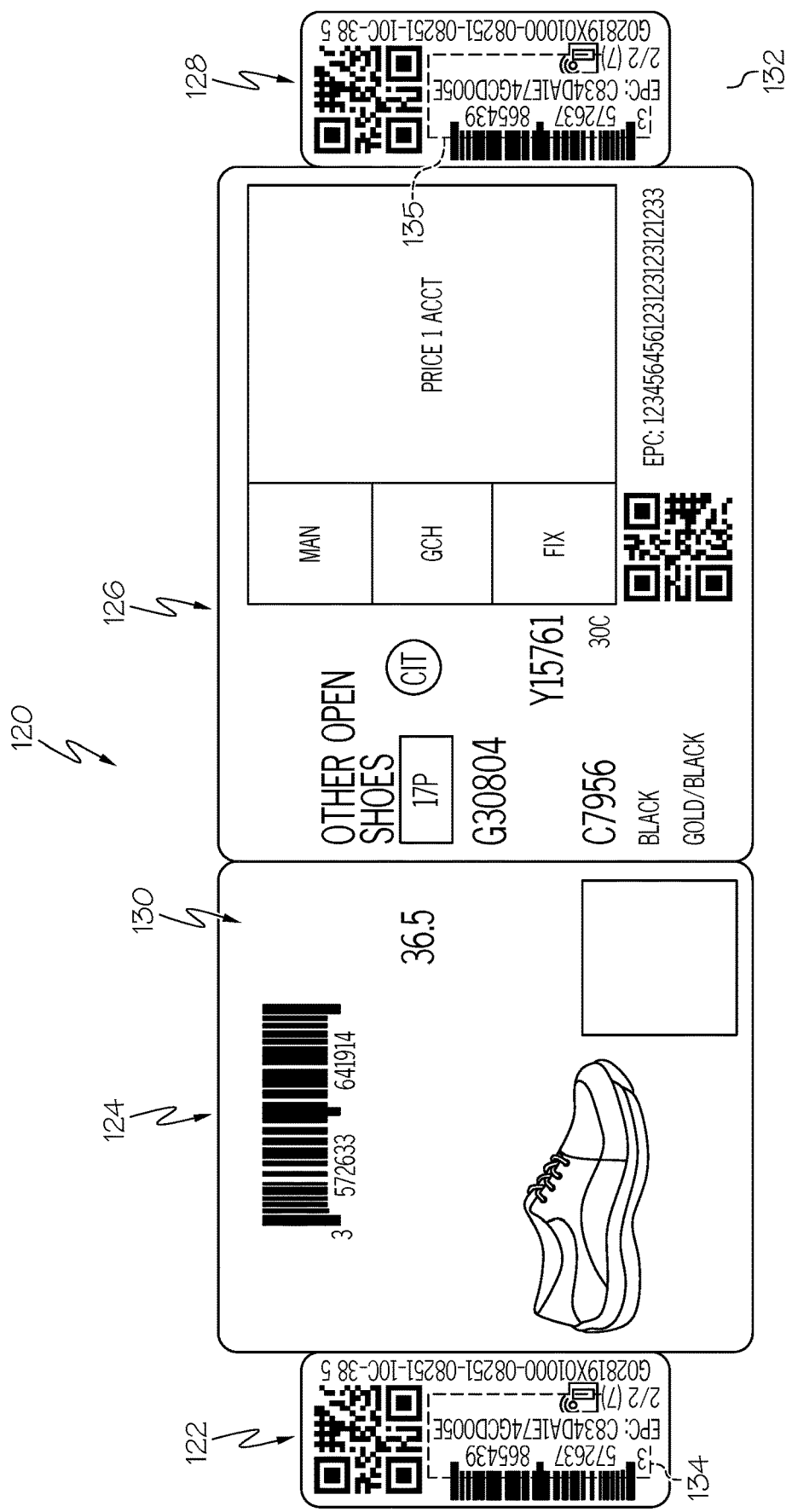
FIG. 5 illustrates a fifth example embodiment composite label construction as disclosed herein.

FIG. 5 illustrates a fifth embodiment composite label construction 120 that is configured comprising four different label sections 122, 124, 126 and 128 that are positioned in series fashion moving from left to right. Each of the four sections are detached from or perforatably attached to an adjacent section or sections to facilitate removal from one another for labeling use. Each section generally comprises a card or tag stock top surface 130 and is a laminate construction of an adhesive layer and a release liner 132 as described above.

The first section 122 is positioned on the left edge of the construction and has a free side edge and an opposite side that is adjacent one side of the second section 124. The first section 122 includes an RFID device 134 disposed within its laminate construction, and the second section 124 is configured larger than the first section and does not include an RFID device. The third section 126 is attached to an opposite side of the second section 124 and does not include an RFID device. In an example, the second and third sections are configured as called for by a particular end-use labeling application, and in this particular embodiment the third section 126 has a length that is greater than the second section 124.

The fourth section 128 is attached to an opposite side of the third section 126, and is positioned on the right edge of the label construction. The fourth section 128 is constructed in a manner similar to that of the first section, comprising an RFID device 135 disposed within its laminate construction. Configured in this manner, each of the four sections are removable from the liner 132 forming adhesive stickers for attaching to a desired article or substrate depending on the particular end-use application. In an example embodiment, the label construction 120 is configured for use with shoes and the like.

The example label construction illustrated in FIG. 5 is but one example of how label constructions as disclosed herein may be configured comprising a number of different label sections that are each adhesive labels, i.e., that do not form a hang tag, and wherein at least one of the sections include an RFID device. While the example label construction illustrated in FIG. 5 comprises two RFID adhesive labels, it is to be understood that label constructions within the scope of this disclosure may include one, two or any number of RFID adhesive labels, and wherein the remaining sections of the label construction may be configured as desired to address a particular end-use labeling application. Further, the label sections illustrated in FIG. 5 may be arranged in a manner different than illustrated and be within the scope of this disclosure, e.g., the second and third sections may be provided on one portion of the liner and the first and fourth RFID containing sections may be provided adjacent one another along an edge of the first or third section.

A feature of all such label constructions as disclosed herein is that the different label sections, while they may be arranged differently that as described and illustrated above, are formed during the same manufacturing process on a common liner for purposes of manufacturing efficiency resulting in a construction providing end-use labeling flexibility.

The foregoing description and accompanying figures illustrate the principles, preferred embodiments and modes of operation of the composite label constructions as disclosed herein. However, such composite label constructions should not be construed as being limited to the particular embodiments discussed above. Additional variations of the embodiments discussed above will be appreciated by those skilled in the art. Therefore, the above-described embodiments should be regarded as illustrative rather than restrictive.

Accordingly, it should be appreciated that variations to those embodiments can be made by those skilled in the art without departing from the scope of the composite label constructions as defined by the following claims.

What is claimed is:

1. A merchandise label construction comprising:
a first section comprising at least a first and a second portion[s] that are positioned adjacent one another forming a laminate construction comprising a first card stock along a top surface and a first adhesive layer disposed beneath the top surface, wherein an RFID device is disposed within one of the first or second portion for formation of the first section as an RFID adhesive label, and further comprising a fold line disposed between any two adjacent portions of the at least first and second portions for folding adhering said adjacent portions for formation of the first section as an RFID dry tag; and
a second section comprising two or more portions disposed adjacent to the first section along at least one edge of the first section in the form of a laminate construction and comprising a second card stock along a top surface of the second section and a second adhesive layer disposed along an underside surface of the second card stock, wherein each portion of the two or more portions of the second section is separable from the first section along the at least one edge, and wherein each portion of the two or more portions is separable from other portions of said two or more portions of said second section;
wherein both the first and second sections include a common release liner that is removably adhered to the first and second adhesive layer.

2. The merchandise label construction as recited in claim 1, wherein the first and second card stock are different.

3. The merchandise label construction as recited in claim 1, wherein the first and second sections are positioned adjacent to one another, and are separated from one another along a separating line by cut or perforations.

4. The merchandise label construction as recited in claim 1, wherein the first section forms the RFID dry tag by removing the first and second portions from the release liner and folding the first and second portions onto one another so that the adhesive layer and RFID device are interposed between the first and second portions.

5. The merchandise label construction as recited in claim 4, wherein any two adjacent portions of the at least a first and a second portions of the first section comprise holes, and the holes align with one another when the first and second portions are folded onto one another to form a hole in the RFID tag for attaching the RFID dry tag to an article.

6. The merchandise label construction as recited in claim 1, wherein the second section forms an adhesive label by removing the second section from the release liner.

7. The merchandise label construction as recited in claim 1, comprising printed indicia on the first and/or second card stock of one or both of the first and second sections.

* * * * *